United States Patent
Sperandio

[15] 3,691,447
[45] Sept. 12, 1972

[54] DEVICE FOR FEEDING OBJECTS BETWEEN TWO POINTS

[72] Inventor: Gottfried Sperandio, 8304 Wallisellen, Steinackerweg 3, Switzerland

[22] Filed: Sept. 28, 1970

[21] Appl. No.: 75,946

[30] Foreign Application Priority Data

July 9, 1970 Germany..........P 20 34 003.8

[52] U.S. Cl. ...................318/685, 318/625, 318/695
[51] Int. Cl..............................................G05b 19/40
[58] Field of Search...............318/685, 625, 603, 695

[56] References Cited

UNITED STATES PATENTS

| | | |
|---|---|---|
| 3,532,958 | 10/1970 | Smith et al.................318/685 |
| 3,404,323 | 10/1968 | Gifford..................318/685 X |
| 3,484,666 | 12/1969 | Easton...................318/685 X |

Primary Examiner—Benjamin Dobeck
Attorney—W. G. Fasse

[57] ABSTRACT

In the present stepping mechanism two stepping motors are driven in synchronism with each other by drive pulses, the supply of which is controlled by an output pulse from an electromechanical comparing device which is stepped by one of the two motors whereas the other motor steps a movable member, for example, a tool support from one point to another.

3 Claims, 1 Drawing Figure

PATENTED SEP 12 1972
3,691,447
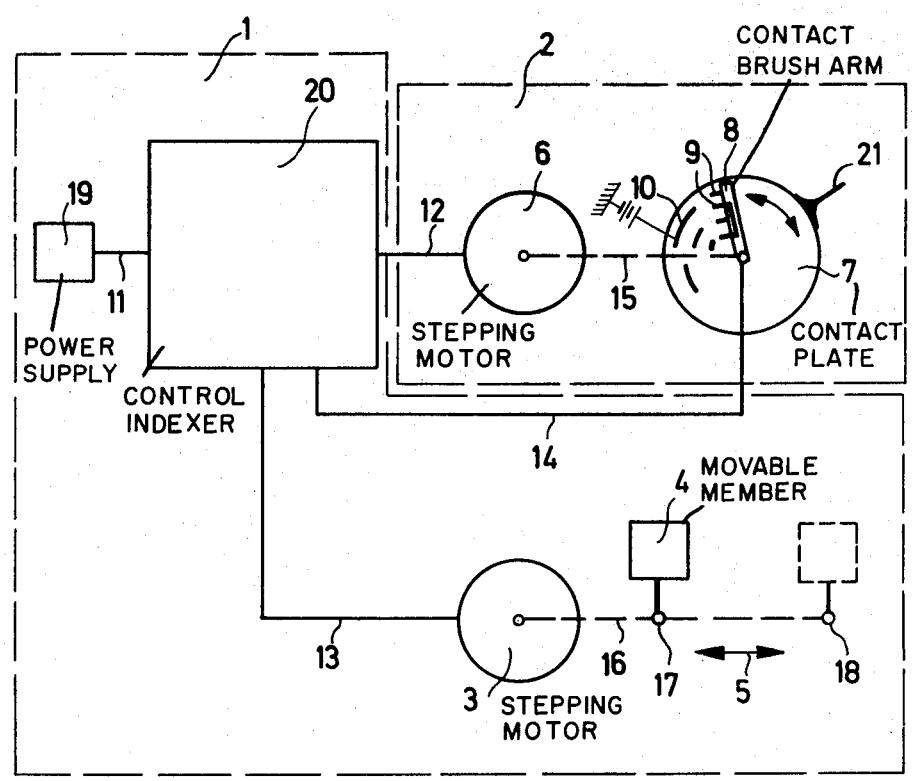
INVENTOR.
GOTTFRIED SPERANDIO
BY
W. G. Fasse

DEVICE FOR FEEDING OBJECTS BETWEEN TWO POINTS

Devices for feeding objects between two points have already become known in prior art which are driven by electric drive stepping motors, the individual steps being counted by digital counters.

The disadvantage of the devices known in prior art is that the digital counters, although accurately counting the steps which the stepping motor is to perform, return to zero in the event of power failure or in the event of disturbing voltages as they frequently occur in practice, so that at the respective time nobody knows how many steps the motor had actually performed. For this reason the devices known in prior art were not readily adopted in practice.

It is the purpose of this invention to provide a device for feeding objects between two points fixing at any time rigorously correct the exact number of steps which the drive stepping motor is to perform, permitting presetting of the same, and making it possible to find out reliably how many steps the drive stepping motor has accurately performed even in the event of power failure or in the case of disturbing voltages.

The invention solves the problem in such a way that, between two points, the object is moved a predetermined number of steps by a driving device using an electric drive stepping motor in such a way that the number of steps can be determined by an electromechanical comparison device featuring presetting of steps and being accurately definable in any position and that the driving mechanism can be switched by the same.

The device has the great advantage that it can be accurately defined at any time how many steps the drive stepping motor has actually performed. An additional factor is that in the event of power failure or upon stoppage of the machine it is possible to continue working immediately from the same place, that means continuing from the already performed number of steps of the drive stepping motor.

This is indispensable in practice, for example in the setting up and operation of machine tools or in optical measurement engineering or for adjusting parabolic mirrors of ground stations or the like.

Moreover, it can be proceeded in such a way that the comparison device consists of a comparing stepping motor and a position measuring device which is driven by the same.

Moreover, both stepping motors can be fed from the same step voltage transmitter. It is, however, also possible that the position measuring device in the comparison device can be preset proportional to the number of steps for the drive stepping motor. This would mean that the stepping motor is driven in a reduction ratio or a transmission ratio relative to the object.

Another possibility is that the comparison device, through the driving device, gives commands to the drive stepping motor.

It can also be proceeded in such a way that several drive stepping motor units, for example for several coordinates or several driving devices at one object, are controlled from one comparison device. The comparison device can be provided with several comparison stepping motors or with a multiple-part position measuring device.

The position measuring device according to the invention can exist of a contact plate which is provided with brush tapping. According to the mathematical functions contacts are provided on the contact plate which are tapped by a brush device.

It can also be proceeded in such a way that the position measuring device is provided with a quickly interchangeable punched card, through the holes of which, as is generally known, brushes touch a contact device.

In the device according to the invention several of these position measuring devices which operate as electromechanical comparison devices can exist and thus several coordinates or several devices can be controllable at the object.

It is, however, also possible to scan the position measuring device photo-electronically or to effect magnetic scanning. In special cases scanning can be possible through a particle radiator through radiating measuring points, it being possible that a scanning system operating particularly reliable is operable over a longer period.

The device has the great advantage that a rigorously correct feeding of objects between two points is possible on a straight or a curved path also in several coordinates or in several working devices at one object.

The device operates accurately even if the entire equipment is occasionally stopped or if power supply is interrupted or if other troubles occur in the plant.

The invention is schematically represented in the attached drawing. In the drawing:

A schematic representation of the device in a block diagram shows the arrangement and cooperation of the individual assemblies.

In the attached drawing the device for advancing a movable member 4 between two points is represented in the block diagram, the driving device 1 and the electromechanical comparison device 2 being bordered by a dotted line.

The driving device 1 comprises a power supply 19 which is connected to the control device or indexer 20 through line 11. Through line 13 the control device 20 feeds the drive stepping motor 3 which can, through a mechanical coupling 16, shift the member 4 from point 17 to point 18. The shifting movement, as an example, is shown in the direction of arrow 5. In the present case it is linear shifting. The shifting movement can, also be along a curved path.

Through line 12 the control device 20 drives the comparison stepping motor 6 which drives through a mechanical coupling 15 a collector arm 8 carrying, for example, brushes 9.

The collector arm 8 with the brushes 9 slides over the contact plate 7 which carries, for example, metal contacts 10, which connect the brushes 9 through a selected contact to a battery according to the circuit arrangement used. The contact plate 7 is rotatable by its handle 21 to connect the selected contact to the battery and thus select the desired number of steps.

The circuit arrangement can be selected according to requirements, it being possible to have brushes and contacts so arranged on the contact plate that, for instance, steps 1–100 can be tapped.

The circuit arrangement is sufficiently known in practice and is not object of the invention. This applies also to the control device 20 which includes one or several step voltage transmitters for driving the stepping motors 3 and 6. The control device 20 as such is a shelf item and not essential to the invention. For example, so called slow-syn indexer number 2SP 1800X-4 manufactured by Superior Electric Co., Bristol, Conn. 06010 could be used.

Instead of the contact plate 7, another position measuring device could be used, which for example, performs linear movements. Another possibility is that between the comparison stepping motor 6 and the contact plate 7 a reduction gear is interposed as position measuring device so that a proportional relation exists between the steps of the drive stepping motor 3 and the comparison stepping motor 6.

It is also possible to reverse the direction of rotation between the two stepping motors 3, 6.

When the contact means 9 on the arm 8 and the selected contact means 10 on the plate 7 meet each other, a signal is supplied through conductor 14, which signal stops the indexer 10. In this way it is assured that always and at any time an accurate number of steps of the drive stepping motor 3 is monitored and determined by the instantaneous position of the arm 8 so that even in the event of power failure or in the event of voltage fluctuations, the number of working steps that have already been performed is recorded at any time and that continuation of work of the device is possible from that point when voltage and line conditions return to normal.

The two stepping motors 3 and 6 perform the same angular steps which are always identical in frequency and number.

It is, of course, also possible to interpose a proportional reduction to perform fractional steps.

The electromechanical plate 7 is adjustable by the lever 21, for example in several directions as shown by the double arrow to select the desired number of steps by connecting the respective contact to the battery.

The control device 20 may drive several stepping motors, for example, for controlling movements in several coordinates or in a time coordinate. In this way it is possible to perform with one control device for example at a machine tool or at some other equipment, a multiple control.

Normally both stepping motors 3 and 6 will run synchronously in step frequency.

The device according to the invention has the great advantage that even in the case of power failure and voltage fluctuations an accurate control of the moveable member 4 is possible from any point of the movement at any time.

The contact plates 7 may, for example, be replaced by a punch card whereby the brush 8 would scan the holes in the punched card. In another embodiment the brush 8 could be replaced by photoelectric, magnetic, or by any other suitable scanning means such as a particle radiator. Thus, it is to be understood, that it is intended to cover all modifications and equivalents within the scope of the appended claims.

I claim:

1. In an apparatus for advancing a movable member 4 between two points in a predetermined number of steps, wherein a known indexing control means 20 drives indexable motors, the improvement comprising a first stepping motor 3, means 13 for connecting said first stepping motor to said indexing control means, coupling means 16 for coupling the first stepping motor 3 to said movable member 4, a second stepping motor 6, means 12 for connecting the second stepping motor 6 also to said indexing control means whereby said first and second stepping motors are stepped in synchronism with each other, a comparing plate 7 carrying a plurality of contacts 10, means 21 for adjusting the comparing plate to a preselected position whereby one of said plurality of contacts in connected to a source of power to represent the preselected number of steps, steppable sensing means 8, means 15 for coupling said steppable sensing means to said second stepping motor 6 conductor means 14 for connecting said steppable sensing means to said indexing control means whereby the latter is stopped when said steppable sensing means come into alignment with said one contact.

2. The apparatus according to claim 1, wherein said comparing plate is a disk and wherein said steppable sensing means is a rotatable contact brush.

3. The apparatus according to claim 1, wherein said plurality of contacts are distributed on said comparing plate in accordance with a coded arrangement positioning said contacts in a predetermined arrangement relative to each other.

* * * * *